(12) United States Patent
Chang et al.

(10) Patent No.: US 7,135,520 B2
(45) Date of Patent: Nov. 14, 2006

(54) GLASS FIBER FILLED THERMOPLASTIC COMPOSITIONS WITH GOOD SURFACE APPEARANCE

(75) Inventors: Moh-Ching Oliver Chang, Wexford, PA (US); Nicholas A. Bakaysza, Pittsburgh, PA (US)

(73) Assignee: Lanxess Corporation, Pittsburgh, PA (US)

( * ) Notice: Subject to any disclaimer, the term of this patent is extended or adjusted under 35 U.S.C. 154(b) by 24 days.

(21) Appl. No.: 10/186,487

(22) Filed: Jul. 1, 2002

(65) Prior Publication Data
US 2004/0002568 A1    Jan. 1, 2004

(51) Int. Cl.
*C08K 3/40* (2006.01)
*C08K 3/34* (2006.01)

(52) U.S. Cl. .................. 524/494; 524/492; 524/493

(58) Field of Classification Search ............... 524/492, 524/493, 430, 494
See application file for complete search history.

(56) References Cited

U.S. PATENT DOCUMENTS

| | | | |
|---|---|---|---|
| 5,039,719 A | 8/1991 | Watanabe et al. | 523/213 |
| 5,519,094 A * | 5/1996 | Tseng et al. | 525/440 |
| 5,728,800 A | 3/1998 | Gottschalk et al. | 528/310 |
| 5,756,576 A * | 5/1998 | Bruls et al. | 525/66 |
| 6,284,830 B1 * | 9/2001 | Gottschalk et al. | 524/449 |
| 2003/0153677 A1 | 8/2003 | Warth et al. | 525/66 |

FOREIGN PATENT DOCUMENTS

| | | |
|---|---|---|
| DE | 41 14 590 | 4/1992 |
| DE | 41 14 589 | 11/1992 |
| DE | 42 11 061 | 10/1993 |
| EP | 0 437 693 | 7/1991 |
| EP | 0 468 462 | 1/1992 |
| WO | 96/36651 | 11/1996 |

* cited by examiner

*Primary Examiner*—Tae H. Yoon
(74) *Attorney, Agent, or Firm*—Nicanor A. Köhncke

(57) ABSTRACT

A glass fiber reinforced thermoplastic molding composition suitable for the preparation of articles having good surface properties is disclosed. The composition contains a resinous blend and a filler component. The resinous blend contains (i) 20 to 50 wt. % of a grafted acrylate rubber, (ii) 2 to 10 wt. % of a first copolymer containing structural units derived from styrene (meth)acrylonitrile and maleic anhydride, (iii) 20 to 80 wt. % polyamide, and (iv) 0 to 40 wt. % of a second copolymer containing structural units derived from styrene and (meth)acrylonitrile, the percents being relative to the total amount of (i), (ii), (iii) and (iv). The filler component of the inventive composition contains 1 to 29 percent of milled glass fibers, in combination with 1 to 29 percent of chopped glass fibers, the percent being relative to the weight of the molding composition. Optionally, the inventive composition also contains a positive amount of a wollastonite. Molded articles that are prepared of the composition feature good mechanical properties and excellent surface quality.

19 Claims, No Drawings

GLASS FIBER FILLED THERMOPLASTIC COMPOSITIONS WITH GOOD SURFACE APPEARANCE

FIELD OF THE INVENTION

The invention relates to glass-reinforced thermoplastic molding compositions and more particularly to compositions containing grafted acrylate rubber and polyamide.

SUMMARY OF THE INVENTION

A glass fiber reinforced thermoplastic molding composition suitable for the preparation of articles having good surface properties is disclosed. The composition contains a resinous blend and a filler component. The resinous blend contains
(i) 20 to 50 wt. % of a grafted acrylate rubber (ii) 2 to 10 wt. % of a first copolymer containing structural units derived from styrene, (meth)acrylonitrile and maleic anhydride (iii) 20 to 80 wt. % polyamide, and (iv) 0 to 40 wt. % of a second copolymer containing structural units derived from styrene and (meth)acrylonitrile. The filler component of the inventive composition contains (a) 1 to 29 percent of milled glass fibers and (b) 1 to 29 percent of chopped glass fibers, the percent being relative to the weight of the molding composition. The inventive composition may optionally further contain a positive amount of a wollastonite. Molded articles that are prepared of the composition feature good mechanical properties and excellent surface quality.

BACKGROUND OF THE INVENTION

Thermoplastic molding compositions that contain grafted acrylate rubber are known. Also known are such compositions that are reinforced with glass fibers. The challenge of obtaining such reinforced compositions that are suitable for making molded articles of exceptionally good surface qualities has not yet been met.

The objective of the work leading to the present invention therefore has been to develop a thermoplastic molding composition that combines the good properties of grafted acrylate rubber with the reinforcing effect of glass fibers without sacrificing the surface quality of the molded article.

DETAILED DESCRIPTION OF THE INVENTION

The thermoplastic molding composition of the present invention contains a resinous blend and a filler component. The resinous blend contains
(i) 20 to 50, preferably 25 to 45 percent of a grafted acrylate rubber (herein referred to as ASA),
(ii) 2 to 10, preferably 4 to 8 percent of a first copolymer having a weight average molecular weight of 60,000 to 180,000, preferably 100,000 to 140,000 g/mole and containing structural units derived from styrene (including substituted styrene wherein substituents are halogens or alkyl groups, as well as alpha methyl styrene), (meth)acrylonitrile and maleic anhydride, and
(iii) 20 to 80, preferably 25 to 60 percent of polyamide.
(iv) 0 to 40, preferably 5 to 25 percent by weight of a second copolymer having a weight average molecular weight of 70,000 to 200,000, preferably 105,000 to 155,000 g/mole, the structure of which contains units derived solely from styrene and (meth)acrylonitrile.

The filler component of the inventive composition contains
(a) 1 to 29 percent of milled glass fibers having an average length of about 1/64" to 1/16", and
(b) 1 to 29 percent of chopped glass fibers,
the percents, all occurrences, being relative to the weight of the molding composition.

Optionally, the inventive composition may further contain a positive amount of up to 29 percent by weight, preferably up to 10 percent (relative to the weight of the molding composition) of wollastonite, in the form of particles having an average length of 20 to 300, preferably 30 to 250 microns and particle diameter of 2 to 20, preferably 3 to 12 microns.

The ASA Resin

Component (a), the ASA resin (acrylate-styrene-acrylonitrile interpolymer), is known as an impact-modified, substantially thermoplastic resin which comprises a SAN matrix in which is dispersed an acrylate elastomer phase as impact modifier. Advantageous ASA resins which are commercially available comprise a crosslinked (meth)acrylate elastomer, a crosslinked SAN copolymer and a substantially linear SAN copolymer. Methylated styrenes such as α-methyl styrene or vinyl toluene may be used in place of all or part of the styrene.

The ASA resins may be prepared by a variety of known methods involving emulsion or bulk polymerization. The preferred ASA resins are of core-shell structure; these structures are well known in the art and have been disclosed in, among others U.S. Pat. No. 3,944,631 that is incorporated herein by reference. The (meth)acrylate elastomer core portion of these resins may be composed of alkyl, aryl, or arylalkyl esters of acrylic or methacrylic acids. These may be prepared by a two-step process in which the (meth)acrylate elastomer core (which may by at least partially crosslinked, such as by the known incorporation of polyfunctional vinyl compounds) is covered with a thermoplastic shell of polymethyl methacrylate, polystyrene, styrene-acrylonitrile copolymer, or similar vinyl (co)polymers.

Other ASA resins which may be advantageously used in the composition of the invention are the types disclosed in U.S. Pat. Nos. 3,655,824; 3,830,878; 3,991,009; 4,433,102; 4,442,263; and 4,409,363, all of which are incorporated herein by reference. These ASA resins are thermoplastic resins that are typically made of an acrylate ester, styrene (or α-methylstyrene), and acrylonitrile. These resins exhibit good impact, heat distortion and weathering characteristics.

The ASA component of the inventive composition is present in an amount of 20 to 50, preferably 25 to 45 percent by weight relative to the weight of the resinous blend.

The First Copolymer

The first copolymer, having weight average molecular weight of 60,000 to 180,000, preferably 100,000 to 140,000 g/mole, contains structural units derived from styrene (including substituted (α-methyl)styrene wherein substituents are halogens or alkyl groups), (meth)acrylonitrile and maleic anhydride.

Structurally, the first copolymer contains 50 to 90, preferably 60 to 80 wt. percent of units derived from styrene, 10 to 50, preferably 20 to 40 wt. percent of units derived from (meth)acrylonitrile and 0.2 to 30, preferably 0.5 to 5 wt. percent of units derived from maleic anhydride, the wt. percents being relative to the weight of the first copolymer. The preparation of the first copolymer is conventional.

The first copolymer is present in the inventive composition in an amount of 2 to 10, preferably 4 to 8 percent by weight relative to the weight of the resinous blend.

The Polyamide Resin

The polyamide resins used in the blends of this invention are well known in the art and embrace semi-crystalline and amorphous resins having a molecular weight of at least 5000 and commonly referred to as nylons. Suitable polyamides include those described in U.S. Pat. Nos. 2,071,250; 2,071,251; 2,130,523; 2,130,948; 2,241,322; 2,312,966; 2,512,606; 3,393,210; 2,071,250; 2,071,251; 2,130,523; 2,130,948; 2,241,322; 2,312,966; and 2,512,606; all incorporated herein by reference.

The polyamide resin may be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon), the polyamide produced by ring opening of lactams, i.e., polycaprolactam, polylauric lactam, poly-11-amino-undecanoic acid, bis(paraaminocyclohexyl) methane dodecanoamide. It is also possible to use in this invention polyamides prepared by the copolymerization of two of the above polymers or terpolymerization of the above polymers on their components, e.g., an adipic, isophthalic acid hexamethylene diamine copolymer. Preferably, the polyamides are linear with a melting point in excess of 200 degrees C. The term "nylon" as used herein refers to nylon containing conventional compounding ingredients as are known to those skilled in the art. Examples of the polyamide resin are Nylon 4, Nylon 6, Nylon 7, Nylon 8, Nylon 9, Nylon 11, Nylon 12, Nylon 66, Nylon 610, etc. These polyamide resins may be used alone or in combination.

The polyamide component of the inventive composition is present in an amount of 20 to 80, preferably 25 to 60 percent relative to the weight of the resinous blend.

The Second Copolymer

The second copolymer, having weight average molecular weight of 70,000 to 200,000, preferably 105,000 to 155,000 g/mole, the structure of which contains units derived solely from styrene and (meth)acrylonitrile wherein the structural units derived from styrene amount to about 55 to 85% and the units derived from acrylonitrile amount to 15 to 45%, the percents being relative to the weight of the second copolymer. The preparation of the second copolymer is conventional.

The second copolymer is present in the inventive composition in an amount of 0 to 40, preferably 5 to 25 percent by weight relative to the weight of the resinous blend.

The Filler Component

The filler component of the inventive composition contains 1 to 29 percent of milled glass fibers having an average length of about 1/64" to 1/16" and 1 to 29 percent of chopped glass fibers, the percent being relative to the weight of the molding composition. In an additional embodiment of the invention the filler component further contains wollastonite. The wollastonite is in the form of particles having an average length of 20 to 300, preferably 30 to 250 microns and particle diameter of 2 to 20, preferably 3 to 12 microns.

(a) Milled Glass Fibers

Milled glass fibers have been widely used as a filler for polymeric systems, see, for instance, U.S. Pat. Nos. 4,381,352, 4,680,214, and 4,861,803. The standard milled glass fiber used in the industry has a diameter of about 16 micrometers and average length of about 1/64" to 1/16". More information relative to the milled glass fibers has been disclosed in S. H. Metzger, Jr. and K. Seel, "High Modulus RIM Elastomers for Automotive Exterior Body Panels" in J. Cell. Plastics, 268–273 (1981) and in U.S. Pat. No. 4,381,352, both incorporated herein by reference. The length of a glass fiber can be expressed in various ways, such as average fiber length or as bulk density. For example, the average length of a "1/16-inch" milled glass fiber is about 0.006 inches (0.253 mm) and the bulk density of such a fiber is about 0.500 g/cm$^3$. It has now been found that milled glass fiber, having a diameter of 10 to 20 micrometers provides unexpected advantages when used as a filler for the inventive composition.

The inventive composition contains 1 to 29, preferably 3 to 25 percent of milled glass fibers the percent being relative to the weight of the molding composition.

(b) Chopped Glass Fibers

Chopped glass fibers have been widely used as a filler for polymeric systems. The standard cut length of the chopped glass fibers used in the invention is 1 to 20 mm, preferably 2 to 10 mm. The nominal diameter of the chopped glass fibers used is 2 to 50 micrometers, preferably 5 to 20 micrometers.

The inventive composition contains 1 to 29, preferably 3 to 25 percent of chopped glass fibers the percent being relative to the weight of the molding composition.

The Optional Component

Characterized in terms of the physical dimensions of its particles, the median diameter ($D_{50}$) of the optional wollastonite component in the context of the present invention is about 2 to 20, preferably 3 to 12, most preferably 5 to 10 microns and its length is about 20 to 300, preferably 30 to 250, most preferably 100 to 200 microns. The median diameter of the wollastonite, is determined as equivalent spherical diameter by Sedigraph (X-ray). The length (volume-weighted mean) is determined microscopically by image analysis. The amount of the optional wollastonite in the inventive composition is a positive amount of up to 29 percent, preferably up to 10 percent (the percents being relative to the weight of the molding composition).

Other additives known in the art for their art recognized function may also be included in the inventive composition in functional amounts. These include flame retarding agents, mold release agents, lubricants and stabilizers, including thermal, hydrolytic and UV stabilizers as well as dyes and pigments.

The inventive composition offers distinct advantages over corresponding compositions that contain chopped glass fibers. The surface properties of the instant compositions are surprisingly and unexpectedly improved there over.

The preparation of the inventive composition is conventional and may be carried out by following procedures and using equipment that are well known to the art-skilled.

The invention will be better understood with reference to the following examples, which are presented for purposes of illustration rather than for limitation, and which set forth the best mode contemplated for carrying out the invention.

EXAMPLES

The properties of the exemplified compositions were determined as noted below:

Flexural properties: determined at room temperature using an Instron universal machine with cross-head speed of 0.05 in/minute in accordance with ASTM D-790. The test specimens measured 6.35 cm×1.27 cm×3.18 cm.

Tensile properties: determined at room temperature using an Instron universal machine with cross-head speed of 5 mm/minute in accordance with ASTM D-638. Type I tensile bars were used as test specimens.

Impact Strength (Izod @ 1/8" and 1/4" thickness) at room temperature (RT) was determined in accordance with ASTM D256. The test specimens measured 6.35 cm×1.27 cm×indicated thickness. Vicat—is the softening temperature (1 Kg), ° C. determined according to ASTM D1525. The temperature of the oil increased at a rate of 2° C./minute.

DTUL—is the deflection temperature under load (264 psi (1.8 MPa)), ° C., determined according to ASTM D648. The temperature of the oil increased at a rate of 2° C./minute.

The quality of the surface of molded articles was evaluated visually and ranked from "good" (1) to "poor" (5)—The base line for the ranking is that of an unfilled-ASA the ranking of which is 1. The ranking considered the presence/absence of smudges, and streaks and locals of non-uniform color. The inclusion of black pigment in the compositions aided the evaluations because surface defects are more noticeable in molding thus pigmented.

The parts of Molding-1 were made with the tool with the dimension of 4"×6"×0.1", with the fan gate thickness of 0.1". The dimensions of the tool used in making the parts of Molding-2 were 3.5"×2.25"×0.158". The tool was side gated with the gate size of 0.1".

Compositions in accordance with the invention and comparative examples were prepared and their properties determined; a summary of the testing is presented in the following tables. In addition to the components indicated below, each of the compositions also contained identical amounts of an antioxidant, light absorber, light stabilizer and pigment, which have no criticality in the present context.

The compounding of the compositions and the molding of test specimens were carried out following the procedures summarized below:

| Compounding | |
|---|---|
| Extruder: | ZSK 30-mm twin-screw extruder |
| Melt Temperature: | Set at: 200, 240, 270, 280, 285, 250 degree C. Zone-1, 2, 3, 4, 5 and die, respectively |
| Screw Speed: | 300 rpm |

| Injection Molding | |
|---|---|
| Molding Machine: | New Britain 200-Ton |
| Melt Temperature: | Set at: 500, 500, 500, 500 degree F. for Zone-1, 2, 3 and nozzle, respectively |
| Mold Temperature: | Set at: 180 degree F. |

The compositions that were tested were identical in terms of the compositional makeup of their resinous components and additives.

The resinous component of each of the compositions contained 35.0 wt. % of ASA rubber.

6.0 wt. % of a copolymer of styrene, acrylonitrile, and maleic anhydride (the relative amounts of these components were 66.5/32.5/1%; the weight-average molecular weight of the copolymer was 115,000 g/mole).

44 wt. % of a polyamide 6 having relative viscosity of 48 (measured as a solution in formic acid) determined in accordance with ASTM D789.

15 wt. % of a copolymer of styrene-acrylonitrile (SAN) containing 67.5 wt. % styrene and 32.5 wt. % acrylonitrile (weight-average molecular weight of 133,000 g/mole).

The component designated ASA 1—used in Examples 1 and 2—contained SAN grafted onto a crosslinked poly(butyl acrylate-acrylonitrile) rubber substrate having a monomodal particle size distribution and an average particle size of 0.15 microns.

The component designated ASA 2—used in Examples 3 and 4 was a blend of SAN-grafted butyl acrylate rubbers. In each of the components of this blend the acrylate rubber substrate had a core-shell structure wherein core contained styrene and the shell was crosslinked poly(butyl acrylate). The one SAN-grafted butyl acrylate had average particle sizes of 0.4 microns and the second SAN-grafted butyl acrylate had average particle sizes of 0.15 microns.

The filler components contained:
Chopped glass fibers having average length of 1/8" and an average filament diameter of 10 micrometers, PPG 3540.
Milled glass fiber, average length 1/32" and average filament diameter of 15.8 micrometers, a product of Owens Corning
Wollastonite, average particle size of 8 micrometers, a product of Nyco.
Each of the compositions further contained:
N,N'-hexamethylene bis[3-(3,5-di-t-butyl-4-hydroxyphenyl)propionamide]—an antioxidant—1 pphr (parts per one hundred weight of resin);
2-(2'-hydroxy-3',5'-di-tert-amyl phenyl) benzotriazole—light absorber—0. 5 pphr;
bis(2,2,6,6,-tetramethyl-4-piperidinyl) sebacate—light stabilizer—0.5 pphr.

Also included in each was 4.3 pphr of a color concentrate containing carbon black (25% relative to the weight of the concentrate) and 75 wt % SAN copolymer (wt. 31% Acrylonitrile). None of the components is believed to have criticality in the present context.

The percents of chopped glass fibers and milled glass fibers indicated in the tables below are in terms of percentage relative to the weight of molding compositions Example 1

|  | A-0 | A-1 | A-2 |
|---|---|---|---|
| Chopped glass fiber, 1/8" | 25% | 12.5% | 19% |
| milled glass fiber, 1/32" | 0% | 12.5% | 6% |
| Flexural strength at Yield, Mpa | 153 | 113 | 129 |
| Flexural Modulus, MPa | 5960 | 4370 | 4720 |
| Flexural Modulus × $10^{-5}$ psi | 8.6 | 6.3 | 6.8 |
| Tensile Strength, MPa | 94 | 72 | 84 |
| Elongation at Failure, % | 3.9 | 5.3 | 4.5 |
| Tensile Modulus, MPa | 6740 | 5060 | 5780 |
| Tensile Modulus × $10^{-5}$ psi | 9.8 | 7.3 | 8.4 |
| Impact strength, Izod 1/8" at RT, ft-lb/in | 1.7 | 1.3 | 1.4 |
| Impact strength, Izod 1/4" at RT, ft-lb/in | 1.8 | 1.6 | 1.7 |
| Vicat (1 Kg), ° C. | 198 | 178 | 190 |
| DTUL (264 psi), ° C. | 103 | 98 | 99 |

-continued

|  | A-0 | A-1 | A-2 |
|---|---|---|---|
| Molding-1 | 2–3 | 1 | 1 |
| Molding-2 | 2 | 1 | 1 |

The results show that moldings made of the inventive compositions feature surface of better quality than corresponding articles made of closely related compositions that do not contain the inventive filler.

Example 2

|  | B-0 | B-1 | B-2 |
|---|---|---|---|
| chopped glass fiber, 1/8" | 30% | 15% | 10% |
| milled glass fiber, 1/32" | 0% | 15% | 20% |
| Flexural strength at yield, Mpa | 150 | 132 | 107 |
| Flexural Modulus, Mpa | 6560 | 5720 | 4550 |
| Flexural Modulus × $10^{-5}$ psi | 9.5 | 8.3 | 6.6 |
| Tensile Strength, Mpa | 98 | 77 | 62 |
| Elongation at Failure, % | 3.6 | 3.8 | 2.8 |
| Tensile Modulus, Mpa | 7820 | 6310 | 5320 |
| Tensile Modulus × $10^{-5}$ psi | 11.3 | 9.1 | 7.7 |
| Impact strength, Izod 1/8" at RT, ft-lb/in | 1.8 | 1.5 | 1.2 |
| Impact strength, Izod 1/4" at RT, ft-lb/in | 1.7 | 1.7 | 1.3 |
| Vicat (1 Kg), ° C. | 198 | 188 | 180 |
| DTUL (264 psi), ° C. | 99 | 99 | 96 |
| Molding-1 | 3–4 | 1 | 1 |
| Molding-2 | 4 | 2–3 | 1 |

The results show that moldings made of the inventive compositions feature surface of better quality than corresponding articles made of closely related compositions that do not contain the inventive filler.

Example 3

|  | C-0 | C-1 |
|---|---|---|
| chopped glass fiber, 1/8" | 25% | 12.5% |
| milled glass fiber, 1/32" | 0% | 12.5% |
| Flexural strength at yield, Mpa | 151 | 101 |
| Flexural Modulus, Mpa | 5510 | 3530 |
| Flexural Modulus × $10^{-5}$ psi | 8.0 | 5.1 |
| Tensile Strength, Mpa | 96 | 63 |
| Elongation at Failure, % | 2.8 | 4.9 |
| Tensile Modulus, Mpa | 7170 | 3760 |
| Tensile Modulus × $10^{-5}$ psi | 10.4 | 5.5 |
| Impact strength, Izod 1/8" at RT, ft-lb/in | 2.1 | 1.6 |
| Impact strength, Izod 1/4" at RT, ft-lb/in | 1.8 | 1.5 |
| Vicat (1 Kg), ° C. | 201 | 192 |
| DTUL (264 psi), ° C. | 104 | 90 |
| Molding-2 | 5 | 1 |

The results show that moldings made of the inventive compositions feature surface of better quality than corresponding articles made of closely related compositions that do not contain the inventive filler.

Example 4

|  | D-0 | D-1 | D-2 |
|---|---|---|---|
| chopped glass fiber, 1/8" | 30% | 7.5% | 7.5% |
| milled glass fiber, 1/32" | 0% | 22.5% | 15% |
| wollastonite, 8 microns | 0% | 0% | 7.5% |
| Flexural strength at Yield, Mpa | 167 | 100 | 113 |
| Flexural Modulus, MPa | 6690 | 4000 | 4560 |
| Flexural Modulus × $10^{-5}$ psi | 9.7 | 5.8 | 6.6 |
| Tensile Strength, MPa | 105 | 57 | 63 |
| Elongation at failure, % | 3.0 | 4.5 | 3.8 |
| Tensile Modulus, Mpa | 8445 | 4850 | 5950 |
| Tensile Modulus × $10^{-5}$ psi | 12.2 | 7.0 | 8.6 |
| Impact strength, Izod 1/8" at RT, ft-lb/in | 1.9 | 1.2 | 2.0 |
| Impact strength, Izod 1/4" at RT, ft-lb/in | 1.9 | 1.2 | 1.1 |
| Vicat (1 Kg), ° C. | 201 | 192 | 193 |
| DTUL (264 psi), ° C. | 103 | 91 | 93 |
| Molding-2 | 5 | 1 | 3 |

The results show that moldings made of the inventive compositions feature surface of better quality than corresponding articles made of closely related compositions that do not contain the inventive filler. The optional wollastonite is featured in Example D-2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a resinous blend and a filler component wherein resinous blend contains
   (i) 20 to 50 percent of a grafted acrylate rubber,
   (ii) 2 to 10 percent of a first copolymer having a weight average molecular weight of 60,000 to 180,000 g/mole containing structural units derived from styrene, (meth) acrylonitrile and maleic anhydride, and
   (iii) 20 to 80 percent by weight of polyamide,
   (iv) 0 to 40 percent by weight of a second copolymer having a weight average molecular weight of 70,000 to 200,000 g/mole the structure of which contains units derived solely from styrene and (meth)acrylonitrile, and where filler component contains
   (a) 1 to 29 percent of milled glass fibers having an average length of about 1/64" to 1/16", and
   (b) 1 to 29 percent of chopped glass fibers,
the percents, all occurrences being relative to the weight of the composition.

2. The composition of claim 1 wherein the grafted acrylate rubber is present in an amount of 25 to 45 percent.

3. The composition of claim 1 wherein the first copolymer is present in an amount of 4 to 8 percent.

4. The composition of claim 1 wherein the first copolymer has an average molecular weight of 100,000 to 140,000 g/mole.

5. The composition of claim 1 wherein the first copolymer comprise structural units derived from a member selected from the group consisting of styrene, halogen substituted styrene, alkyl substituted styrene and alpha methyl styrene.

6. The composition of claim 1 wherein the second copolymer is present in an amount of 5 to 25 percent.

7. The composition of claim 1 wherein the second copolymer has molecular weight of 105,000 to 155,000 g/mole.

8. The composition of claim 1 further containing wollastonite in a positive amount up to 29 percent relative to the weight of the composition.

9. The composition of claim 1 further containing wollastonite in a positive amount up to 10 percent relative to the weight of the composition.

10. The composition of claim 1 wherein polyamide is present in an amount of 25 to 60 percent.

11. A thermoplastic molding composition comprising a resinous blend and a filler component wherein resinous blend contains
   (i) 25 to 45 percent of a grafted acrylate rubber,
   (ii) 4 to 8 percent of a first copolymer having a weight average molecular weight of 60,000 to 180,000 g/mole containing structural units derived from styrene, (meth)acrylonitrile and maleic anhydride, and
   (iii) 25 to 60 percent by weight of polyamide,
   (iv) 5 to 25 percent by weight of a second copolymer having a weight average molecular weight of 105,000 to 155,000 g/mole the structure of which contains units derived solely from styrene and (meth)acrylonitrile,
   and where filler component contains
      (a) 1 to 29 percent of milled glass fibers having an average length of about 1/64" to 1/16", and
      (b) 1 to 29 percent of chopped glass fibers, and
      (c) a positive amount of up to 10 percent of wollastonite the median diameter of which particles is 2 to 20 microns,
the percents, all occurrences, being relative to the weight of the composition.

12. A thermoplastic molded article comprising:
a resinous blend and a filler component,
wherein resinous blend includes,
   (i) 20 to 50 percent of a grafted acrylate rubber,
   (II) 2 to 10 percent of a first copolymer having a weight average molecular weight of 60,000 to 180,000 g/mole containing structural units derived from styrene, (meth)acrylonitrile and maleic anhydride, and
   (iii) 20 to 80 percent by weight of polyamide,
   (iv) 0 to 40 percent by weight of a second copolymer having a weight average molecular weight of 70,000 to 200,000 g/mole The structure of which contains units derived solely from styrene and (meth)acrylonitrile,
wherein the filler components includes and effective amount of,
   (a) 1 to 29 percent of milled glass fibers having an average length of about 1/64" to 1/16", and
   (b) 1 to 29 percent of chopped glass fibers,
wherein the percents are relative to the weight of the composition.

13. A thermoplastic molded article comprising:
a resinous blend and a filler component,
wherein resinous blend includes,
   (i) 20 to 50 percent of a grafted acrylate rubber,
   (ii) 2 to 10 percent of a first copolymer having a weight average molecular weight of 60,000 to 180,000 g/mole containing structural units derived from styrene, (meth)acrylonitrile and maleic anhydride, and
   (iii) 20 to 80 percent by weight of polyamide,
   (v) 0 to 40 percent by weight of a second copolymer having a weight average molecular weight of 70,000 to 200,000 g/mole the structure of which contains units derived solely from styrene and (meth)acrylonitrile,
wherein the filler components includes and effective amount of,
   (a) 1 to 29 percent of milled glass fibers having an average length of about 1/64" to 1/16",
   (b) 1 to 29 percent of chopped glass fibers, and
   (c) a positive amount of up to 10 percent of wollastonite the median diameter of which particles is 2 to 20 microns,
wherein the percents are relative to the weight of the composition.

14. The molded article of claim 13, wherein the grafted acrylate rubber is present in an amount of 25 to 45 percent.

15. The molded article of claim 13, wherein the first copolymer is present in an amount of 4 to 8 percent.

16. The molded article of claim 13, wherein the first copolymer has an average molecular weight of 100,000 to 140,000 g/mole.

17. The molded article of claim 13, wherein the first copolymer comprise structural units derived from a member selected from the group consisting of styrene, halogen substituted styrene, alkyl substituted styrene and alpha methyl styrene.

18. The molded article of claim 13, wherein the second copolymer is present in an amount of 5 to 25 percent.

19. The molded article of claim 13, wherein the second copolymer has a weight average molecular weight of 105,000 to 155,000 g/mole.

* * * * *